J. MARCINKOWSKI.
UTENSIL LIFTER.
APPLICATION FILED MAY 15, 1914.
1,133,442. Patented Mar. 30, 1915.
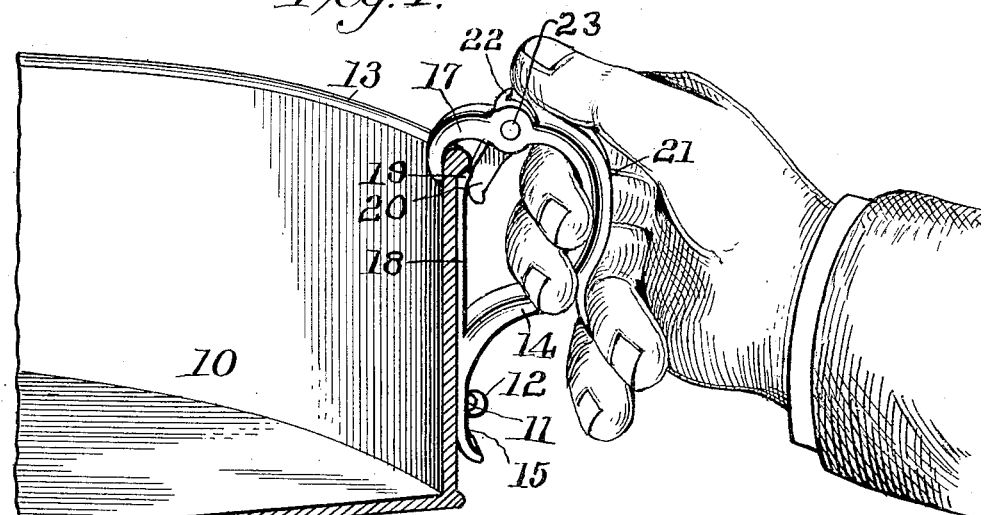
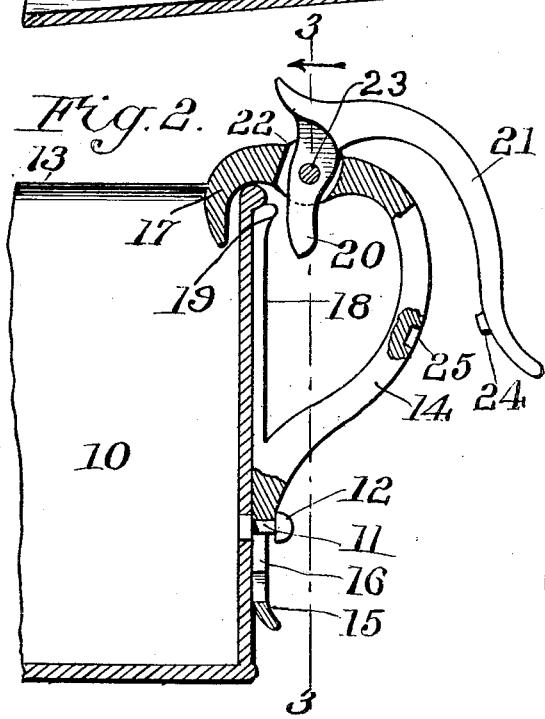
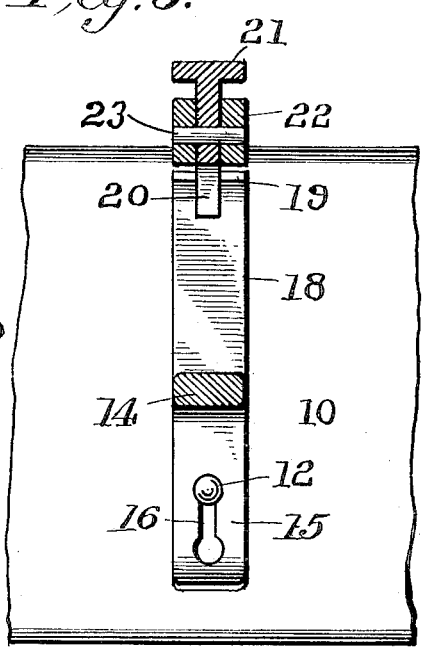
Witnesses
Jos. A. Ryan
S. Z. Torosiewicz
Inventor
Joseph Marcinkowski
By A. M. Wilson
Attorney

UNITED STATES PATENT OFFICE.

JOSEPH MARCINKOWSKI, OF CHICAGO, ILLINOIS.

UTENSIL-LIFTER.

1,133,442.  Specification of Letters Patent.  Patented Mar. 30, 1915.

Application filed May 15, 1914. Serial No. 838,765.

*To all whom it may concern:*

Be it known that I, JOSEPH MARCINKOWSKI, a subject of the Emperor of Austria-Hungary, residing at Chicago, in the county of Cook and State of Illinois, have invented certain new and useful Improvements in Utensil-Lifters, of which the following is a specification.

This invention relates to new and useful improvements in utensil lifters.

The primary object of this device is to provide a removable handle which is readily attached to the rim of any utensil such as a pan or kettle and is adapted for the purpose of lifting the same without burning the hands of the operator.

A further object is to provide a handle device adapted to grippingly engage a utensil for the purpose of lifting the same, such engagement being coincident with the grasping operation of the hand upon the handle.

A further object is to provide a removable handle adapted for securement to a pan by engaging an exterior lug thereon and gripping the edge of the pan simultaneously therewith.

With these general objects in view and others that will appear as the nature of the invention is better understood, the same consists in the novel combination and arrangement of parts hereinafter fully described, illustrated in the accompanying drawings and pointed out in the appended claims.

In the drawings forming a part of this application and in which like designating characters refer to corresponding parts throughout the several views:—Figure 1 is a sectional view through a portion of a pan illustrating the invention as applied thereto and the hand of the operator being also disclosed. Fig. 2 is a sectional view through a pan and a portion of the lifter mounted thereon, and Fig. 3 is a transverse sectional view taken upon line 3—3 of Fig. 2.

Referring more in detail to the drawings, the pan 10 is illustrated as having a lug 11 projecting from the outer side thereof, the said lug having an enlarged head 12 while the improved lifter forming the subject matter of this invention is mounted upon the pan in its operative position and engages the said lug 10 and the top rim or bead 13 of the pan.

The handle 14 is provided of substantially the same shape as the usual utensil handle and has a downward extension 15 provided with a key-hole slot 16, which slot is adapted to receive and engage the lug 10. As will be evident from the drawing, the handle is adapted to rest with the narrow portion of the key-hole slot engaging the lug 11 and restrained from removal by a lateral movement by means of the head 12.

The handle 14 is provided with a curved hook 17 at the end thereof which is opposite to the extension 15. A resilient finger 18 is carried by the handle in substantial alinement with said extension 15 and extending in an opposite direction is slightly spaced from the hook 17 and allows the reception of the pan rim 13 between the hook and the enlarged free end 19 of said finger and in which position, the finger and extension flatly engage the outer surface of the pan with the finger end 19 resting under the outer side of the rim 13, the top of the rim supporting the inner face of the hook 17, while the lug 11 supports the handle resting thereon through the agency of the key-hole slot 16.

A locking lever 20 is pivotally mounted upon a pin 23 within a slot 22 of the upper portion of the handle 14. An arm 21 on the outer end of the lever 20 conforms substantially to the curvature of the handle 14 and is adapted for operating the lever 20 into engagement with the end 19 of the resilient finger and to thereby firmly secure the pan rim between said finger and the hook 17. A projection 24 upon the inner face of the arm 21 is adapted to seat within a socket 25 in the outer face of the handle 14, when the handle and arm are pressed together during the lifting operation and this will assist to prevent any relative side movement between the said handle and arm.

The complete operation of the device is believed to be apparent from this detail description in that, the finger 18 being resilient, the lifter is readily seated upon the pan with the lug 11 received within the key-hole slot 16 and the lifter thereby resting upon said lug and with the hook 17 engaging over the pan rim as shown in Fig. 2. By grasping the handle 14 and the arm 21 for lifting the pan, the said arm is pressed against the handle thereby forcing the lever 20 into engagement with the finger end 19 and firmly holding the entire lifter to the pan, while by releasing the arm 21 the lifter is readily removed from the pan. It is evident that the device will also successfully operate if the lug 11 and the key-hole slot 16 are entirely omitted from the structure, but these latter named elements are preferably employed when the lifter is desired for heavy articles.

While the forms of the invention herein shown and described are what are believed to be preferable embodiments thereof, it is nevertheless to be understood that minor changes may be made in the form, proportion and details of construction without departing from the spirit and scope of the invention as set forth in the appended claims.

What I claim is:—

1. In combination with a utensil having a projecting headed lug thereon, a handle, an extension upon said handle provided with a key-hole slot adapted to receive said lug for seating said handle thereon, a projecting hook upon said handle, a resilient finger upon said handle having its free end slightly removed from said hook and adapted for the reception of the utensil rim between said finger end and hook and means for manually engaging said finger and hook upon said rim.

2. A device of the class described comprising a curved handle having a slot through one portion thereof, a projecting hook and a resilient finger upon said handle having their free ends slightly spaced apart and adapted for the reception of a utensil portion therebetween, a pivoted lever extending through said slot and having its free end adapted for engagement with said finger, and a curved operating arm secured to the outer end of said lever.

3. A device of the class described comprising a curved handle having a slot through one portion thereof, a projecting hook and a resilient finger upon said handle having their free ends slightly spaced apart and adapted for the reception of a utensil portion therebetween, a pivoted lever extending through said slot and having its free end adapted for engagement with said finger, a curved operating arm secured to the outer end of said lever, and a projection upon the inner face of said arm, said handle having a socket on its outer face adapted for the seating reception of said projection therein with said arm flatly engaging said handle when the device is in its operative lifting position.

4. A device of the class described comprising a curved handle having a slot through one portion thereof, a projecting hook and a resilient finger upon said handle having their free ends slightly spaced apart and adapted for the reception of a utensil portion therebetween, a pivoted lever extending through said slot and having its free end adapted for engagement with said finger, a curved operating arm secured to the outer end of said lever, said handle having an extension in substantial alinement with said finger, a utensil, and a headed lug projecting outwardly from said utensil, said extension provided with a key-hole slot adapted for receiving said handle thereon.

5. A device of the class described comprising a curved handle having a slot through one portion thereof, a projecting hook and a resilient finger upon said handle having their free ends slightly spaced apart and adapted for the reception of a utensil portion therebetween, a pivoted lever extending through said slot and having its free end adapted for engagement with said finger, a curved operating arm secured to the outer end of said lever, a projection upon the inner face of said arm, said handle having a socket on its outer face adapted for the seating reception of said projection therein with said arm flatly engaging said handle when the device is in its operative lifting position, said handle having an extension in substantial alinement with said finger, a utensil, and a headed lug projecting outwardly from said utensil, said extension provided with a key-hole slot adapted for receiving said handle thereon.

In testimony whereof I affix my signature in presence of two witnesses.

JOSEPH MARCINKOWSKI.

Witnesses:
KAROL WROBEL,
JOHN SROMOVSKI.

Copies of this patent may be obtained for five cents each, by addressing the "Commissioner of Patents, Washington, D. C."